United States Patent

Meza

[11] Patent Number: 6,048,183
[45] Date of Patent: Apr. 11, 2000

[54] DIAPHRAGM PUMP WITH MODIFIED VALVES

[75] Inventor: Humberto Meza, Tustin, Calif.

[73] Assignee: Shurflo Pump Manufacturing Co., Santa Ana, Calif.

[21] Appl. No.: 09/020,208

[22] Filed: Feb. 6, 1998

[51] Int. Cl.[7] .................................................. F04B 39/00
[52] U.S. Cl. ............................................................ 417/569
[58] Field of Search ..................................... 417/569, 559, 417/566, 269; 137/854, 852; 91/472, 507

[56] References Cited

U.S. PATENT DOCUMENTS

| | | |
|---|---|---|
| 2,413,670 | 12/1946 | Willson ................................. 121/119 |
| 2,462,044 | 2/1949 | Willson ................................. 121/131 |
| 2,942,550 | 6/1960 | Carter . |
| 2,971,470 | 2/1961 | Wein et al. . |
| 2,991,723 | 7/1961 | Zubaty . |
| 3,077,118 | 2/1963 | Robbins . |
| 3,314,600 | 4/1967 | Hadley . |
| 3,496,872 | 2/1970 | Riester et al. . |
| 3,572,375 | 3/1971 | Rosenberg . |
| 3,684,406 | 8/1972 | Edwards . |
| 3,698,287 | 10/1972 | Martin ...................................... 91/507 |
| 4,153,391 | 5/1979 | Hartley . |
| 4,242,061 | 12/1980 | Hartley . |
| 4,305,702 | 12/1981 | Hartley . |
| 4,396,357 | 8/1983 | Hartley . |
| 4,486,151 | 12/1984 | Korhonen-Wesala . |
| 4,507,058 | 3/1985 | Shoenmeyr . |
| 4,545,735 | 10/1985 | Ims . |
| 4,550,749 | 11/1985 | Krikorian ................................ 137/843 |
| 4,610,605 | 9/1986 | Hartley . |
| 4,611,529 | 9/1986 | Stricker et al. . |
| 4,646,781 | 3/1987 | McIntyre et al. . |
| 4,711,224 | 12/1987 | Eckhardt . |
| 4,738,185 | 4/1988 | Kamimura ................................. 91/507 |
| 4,743,169 | 5/1988 | Funakawa et al. . |
| 4,776,776 | 10/1988 | Jones . |
| 4,797,069 | 1/1989 | Hartley et al. . |
| 5,129,794 | 7/1992 | Beatty . |
| 5,203,803 | 4/1993 | Shoenmeyr . |
| 5,301,663 | 4/1994 | Small, Jr. . |
| 5,316,447 | 5/1994 | Fujii et al. .............................. 417/269 |
| 5,325,885 | 7/1994 | Ivan et al. .............................. 137/217 |
| 5,344,292 | 9/1994 | Rabenau et al. . |
| 5,476,367 | 12/1995 | Zimmerman et al. . |
| 5,601,112 | 2/1997 | Seiya et al. ........................ 137/512.15 |
| 5,613,838 | 3/1997 | Newell .................................... 417/269 |
| 5,649,812 | 7/1997 | Schoenmeyr et al. . |
| 5,860,449 | 1/1999 | Schulte ................................... 137/550 |

FOREIGN PATENT DOCUMENTS

| | | |
|---|---|---|
| 93674 | 11/1983 | European Pat. Off. . |
| 509224 | 9/1930 | Germany . |
| 1907454 | 2/1969 | Germany . |
| 404255593 | 9/1992 | Japan . |
| 654636 | 6/1951 | United Kingdom . |

Primary Examiner—Teresa Walberg
Assistant Examiner—Daniel Robinson
Attorney, Agent, or Firm—Stout, Uxa, Buyan & Mullins, LLP; Frank J. Uxa

[57] ABSTRACT

A diaphragm or gasket pump is provided with modified outlet valve and/or inlet valve assemblies which enhance the outlet and/or inlet valve effectiveness and provide long, effective valve lives.

14 Claims, 3 Drawing Sheets

DIAPHRAGM PUMP WITH MODIFIED VALVES

BACKGROUND OF THE INVENTION

Diaphragm pumps possess many advantages and are widely used. A reciprocating drive can be used for a diaphragm pump. A nutating or wobble plate drive can also be used to drive a diaphragm pump, and such construction is shown in U.S. Pat. No. 4,153,391 and U.S. Pat. No. 4,610,605. The disclosure of each of these U.S. patents is incorporated in its entirety herein by reference. Although a wobble plate drive provides a type of back and forth motion, it is quite different from linear reciprocation.

The pumps disclosed in the above-noted U.S. patents provide very satisfactory performance. However, it would be advantageous to provide pumps which provide even more benefits.

Prior art wobble plate pumps have employed inlet and outlet valves which effectively control the flow of fluid to and from the pumping chambers. Over a period of time, however, such prior art valves have been prone to stress, wear, fatigue and the like which ultimately results in reduced pump efficiency and may even adversely effect the life of the pump. It would be advantageous to provide a pump with modified inlet and outlet valves to enhance pump efficiency and/or useful pump life.

The diaphragms of pumps, for example, wobble plate pumps, often include regions which flex as the pistons are driven. Because of this flexing, these regions are prone to substantial wear which can reduce the life of the diaphragm and can adversely affect useful pump life. It would be beneficial to provide pump diaphragms which provide efficiency and/or life benefits.

SUMMARY OF THE INVENTION

This invention provides a diaphragm or gasket pump, preferably a wobble plate pump, which is easy and inexpensive to produce and assemble, achieves outstanding performance and efficiency and has a long effective or useful life.

The present invention is based in part on the discovery that the size and spacial relationships between the inlet and/or outlet valve elements and the valve plates to which such elements are mounted are subject to modifications which have benefits in terms of pump efficiency and/or useful lives. Such modifications can be made inexpensively and straightforwardly while requiring very few new parts. In effect, the benefits of the present invention can be obtained using prior art pumps modified to only a limited extent.

In one aspect of the present invention, the pumps comprise a housing including first and second housing sections, a gasket or diaphragm between the first and second housing sections, at least one fastener for holding the first and second housing sections together, a first pumping member or piston, a drive, for example, including a wobble plate, as described herein, for moving the pumping member, a valve plate mounted to the housing and an outlet valve carried by the valve plate. The housing has at least a first pumping chamber, an inlet, an inlet passage in the housing leading from the inlet to the pumping chamber, an outlet and an outlet passage in the housing leading from the pumping chamber to the outlet. The first pumping member is movable in the first pumping chamber on an intake stroke whereby a fluid from the inlet passage is drawn into the first pumping chamber and a discharge stroke whereby fluid in the first pumping chamber is discharged into the outlet passage. The drive moves the pumping member on the intake and discharge strokes. The pumping member is operatively secured to the drive. Preferably, the drive includes a wobble plate operatively secured to the pumping member for driving the pumping member and a wobble mechanism mounted in the housing for imparting wobbling motion to the wobble plate.

According to one feature of the invention, the valve plate has an outlet passage extending therethrough, and an outlet area adjacent the outlet passage. The outlet area is concave and in the substantial form of a portion of a sphere having a valve plate outlet radius and a valve plate outlet center point. The outlet valve carried by the valve plate includes a convex outlet valve surface adapted to cooperate with the outlet area to control flow through the outlet passage. The convex outlet valve surface is in the substantial form of a portion of a sphere having an outlet valve radius and an outlet valve center point.

In accordance with the present invention, the ratio, designated R, of the outlet valve radius to the valve plate outlet radius is at least 1.08, and preferably is in the range of 1.08 to about 1.2. In addition, the ratio, designated $R_1$, of the difference between the outlet valve center point and the valve plate outlet center point to R is at least 0.06, and preferably is in the range of about 0.06 to about 0.2.

Previous pumps having general configurations similar to the present pumps have a ratio R of 1.04 and a ratio $R_1$ of 0.03. It has been found that configuring the valve plates and outlet valves in accordance with the present invention, in which R is at least 1.08 and $R_1$ is at least 0.06, provides pumps having outstanding outlet valve effectiveness and performance characteristics and long, effective outlet valve lives.

According to another feature of the invention, the valve plate has an inlet passage extending therethrough. The valve plate has an inlet area adjacent the inlet passage. The inlet area is concave and in the substantial form of a portion of a sphere having a valve plate inlet radius and a valve plate inlet center point. The inlet valve carried by the valve plate includes a convex inlet valve surface adapted to cooperate with the inlet area to control flow through the inlet passage. The convex inlet valve surface is in the substantial form of a portion of a sphere having an inlet valve radius and an inlet valve center point.

In accordance with the present invention, the ratio, designated $R_2$, of the inlet valve radius to the valve plate inlet radius is at least 1.25, and preferably is in the range of 1.25 to about 1.45. In addition, the ratio, designated $R_3$, of the difference between the inlet valve center point and the valve plate inlet center point to $R_2$ is at least 0.15 and preferably is in the range of about 0.15 to about 0.40.

Prior art pumps having general configurations similar to the present pumps have a ratio $R_2$ of 1.18 and a ratio $R_3$ of 0.131. It has been found that configuring the valve plates and inlet valves in accordance with the present invention, in which $R_2$ is at least 1.25 and $R_3$ is at least 0.15, provides pumps having outstanding inlet valve effectiveness and performance characteristics and long, effective inlet valve lives.

Without wishing to limit the invention to any particular theory of operation, it is believed that the ratios R and $R_1$, $R_2$ and $R_3$, in accordance with the present invention provide for enhanced performance and useful life of the outlet and inlet valves, respectively. Moreover, such enhancements are obtained without effecting the structure or operation of the present pumps, for example, relative to prior art pumps.

Thus, the valve plates and inlet and outlet valves can be modified and/or configured to comply with the present invention without requiring substantial additional pump changes or modifications.

Although the inlet and outlet valve plate modifications can be used individually, preferably, both outlet and inlet valve modifications are used together. This combination further increases the benefits achieved in accordance with the present invention.

The outlet valve preferably includes a central mounting portion for mounting the outlet valve on the valve plate. In this embodiment, the convex outlet valve surface surrounds the central mounting portion.

With regard to the inlet valve, it too preferably includes a central mounting portion for mounting the inlet valve on the valve plate. The convex inlet valve surface surrounds the central mounting portion of the inlet valve.

The use of central mounting portions as outlined herein provides for very effective valve performance, particularly in combination with the present valve modifications.

The gaskets or diaphragms of the present pumps include a generally annular zone or region, preferably substantially circumscribing a pumping member which flexes when the pumping member is driven by the drive. In one embodiment, this region can be considered to be a convolute which facilitates the movement of the pumping member in the intake and discharge strokes, while reducing the amount of stress on the diaphragm caused by this motion. This facilitates maintaining a long effective life of the gasket or diaphragm. In a particularly useful embodiment, the thickness of the convolute increases, more preferably progressively increases, as the convolute approaches the pumping member. In other words, the portion of the convolute which is radially remote from the pumping member is more thin or less thick than is the portion of the convolute which is radially close to or adjacent the pumping member. Having a convolute which is thicker and more durable close to the pumping member is effective in offsetting the increased stress that exists close to the pumping member.

In addition, the generally annular zone of the gasket or diaphragm is matched, or partially matched, with the nutating motion of the wobble plate. This is accomplished by making the annular zone wider radially and/or deeper axially at a location remote from the nutating axis than at a location nearer the nutating axis. Preferably, the generally annular zone progressively widens radially and/or deepens axially as it extends radially outwardly of the nutating axis. By matching the shape of the generally annular zone to the nutating motion, volumetric efficiency is improved and wear is reduced.

The housing preferably has a second pumping chamber, with the inlet passage leading from the inlet to the second pumping chamber, and the outlet passage leading from the second pumping chamber to the outlet. Preferably, the pump includes a second pumping member movable in the second pumping chamber on an intake stroke whereby a fluid from the inlet passage is drawn into the second pumping chamber, and a discharge stroke whereby fluid in the second pumping chamber is discharged into the outlet passage. The second pumping member is preferably integral with the diaphragm or gasket and the second pumping member is operatively secured to the drive, substantially as the first pumping member is constructed. A pump including three pumping chambers and three pumping members is particularly advantageous.

Although the various features of this invention can be used singly or in any combination, they are preferably used together. The invention, together with additional features and advantages thereof, may best be understood by reference to the following description taken in connection with the accompanying illustrative drawings.

DESCRIPTION OF THE PREFERRED EMBODIMENT

Figure 1:
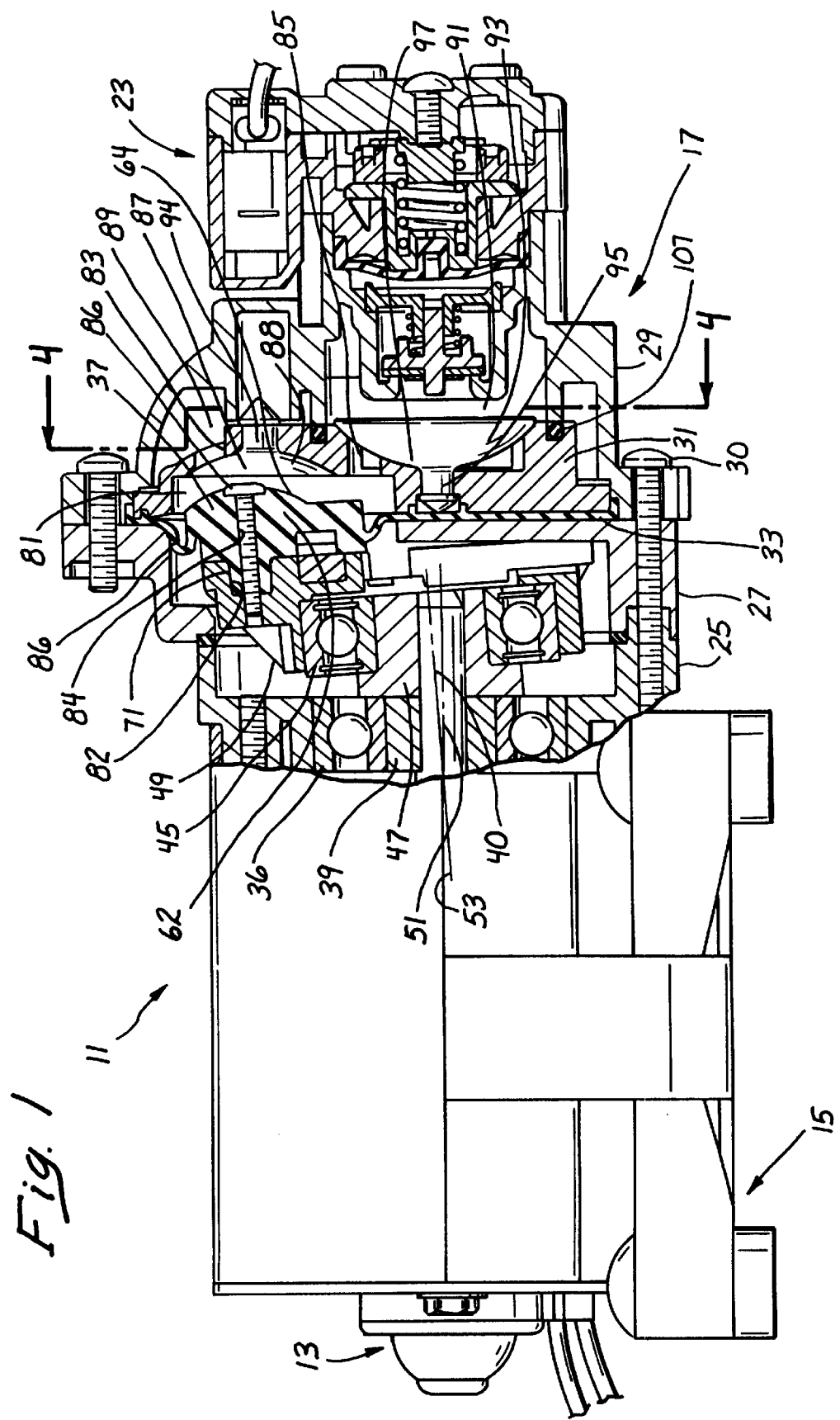
FIG. 1 is an isometric view of a pump constructed in accordance with the teachings of this invention.
Figure 4:
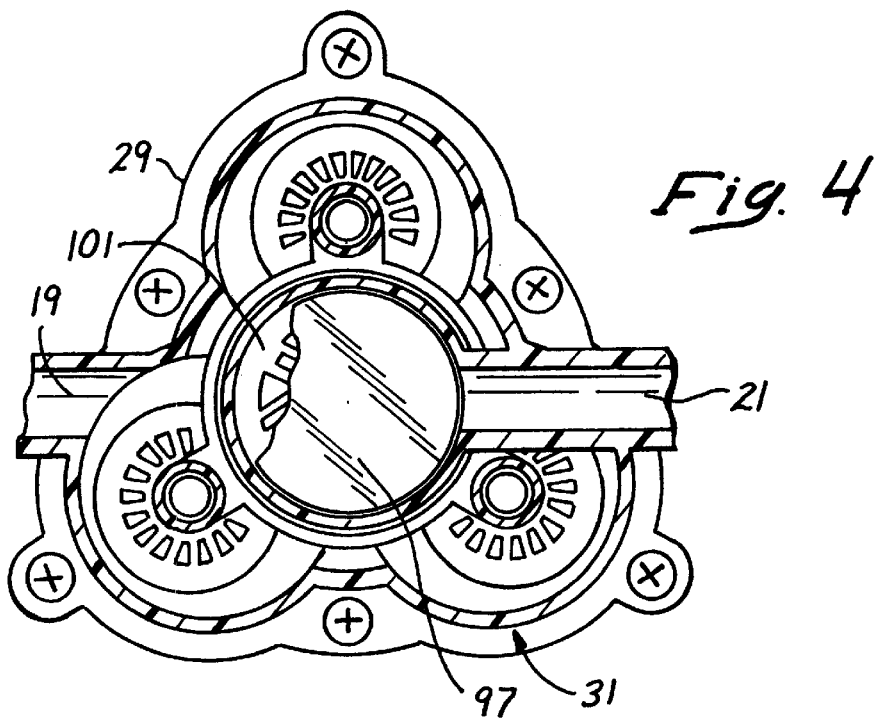
FIG. 4 is a view taken generally along line 4—4 of FIG. 1, with a portion of the outlet valve element broke away.

FIG. 1 shows a pump 11 and an associated electric motor 13 mounted on a suitable base 15. As shown in FIGS. 1 and 4, the pump 11 has a housing 17, an inlet 19, an outlet 21 and a pressure switch assembly 23 mounted on the housing. The pressure switch 23 operates the pump 11 as a demand pump in that it turns the motor 13 on to drive the pump when discharge pressure falls below a predetermined level and turns the motor 13 off when the discharge pressure rises above a predetermined upper level. Pump 11 is particularly useful in pumping water, for example, in potable water systems. One very useful application is as a booster pump in reverse osmosis (RO) water systems.

The housing 17, which may be of any suitable construction, in this embodiment includes a housing section 25 which may be coupled to the motor housing, an intermediate housing section 27 and a forward housing section 29. The housing section 25 can be joined to the housing section 27 and 29 by a plurality of fasteners 30 (FIG. 1). A valve plate 31 and a diaphragm 33 have their peripheral regions clamped between the housing sections 27 and 29. The diaphragm 33 extends completely across the interior of the housing 17 and partitions the housing interior. The housing sections 25, 27 and 29 and the valve plate 31 may be integrally molded from a suitable plastic material.

As shown in FIG. 1, an outer ball bearing 36 is mounted in the housing section 25 and receives a bushing 39 which in turn is drivingly coupled to an output shaft 41 of the motor 13 by virtue of a flat on the shaft and a corresponding flat (not shown) on the bushing 39. An inner ball bearing 45 is mounted on the motor shaft 41 by an eccentric bushing 47. A wobble plate 49 is mounted on the outer race of the ball bearing 45. With this construction, the inner race of the bearing 36, the bushing 39 and the motor shaft 41 rotate about an axis 51, which is coaxial with the motor shaft, and the eccentric bushing 47 and the inner race of the ball bearing 45 rotate about a nutating axis 53. The axes 51 and 53 intersect at a point in the plane of the diaphragm 33 in all rotational positions.

Wobble plate 49 is made of a suitable polymeric material.

The bearings 36 and 45, the bushings 39 and 47 and the wobble plate 49 form a wobble plate drive. With this construction, the wobble plate 49 is subjected to nutating motion.

The wobble plate 49 is received within the housing 17 and defines three chambers 71.

The pumping members 37 are integral with the diaphragm 33, which is preferably made of a suitable flexible, resilient material, which may be a polymeric material or an elastomer. Santoprene, an elastomer sold by Monsanto, is more preferred. The pumping members 37 include outer sidewalls or surfaces 82 which correspond or compliment the inner surfaces of chamber 71 of the wobble plate 49. The pumping members 37 include a central bore 84. Screw-type fasteners 86 are passed into the bores 84 of pumping members 37 and are used to secure the pumping members to the wobble plate 49.

The pumping members 37 include a head portion 62 which extends outwardly from the first end opening 75. Head portion 62 includes a central piston surface 64 which partially defines a pumping chamber 81. Diaphragm 33 includes an annular zone 86 which circumscribes central piston surface 64 and which flexes as the pumping member 37 moves between inlet and discharge strokes.

Figure 5:
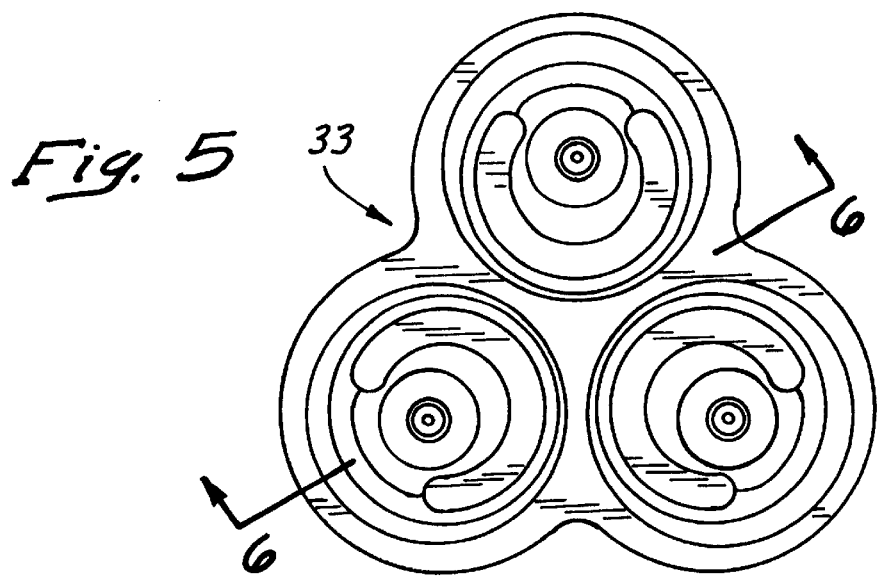
FIG. 5 is a top plan view of a preferred form of the diaphragm.
Figure 6:
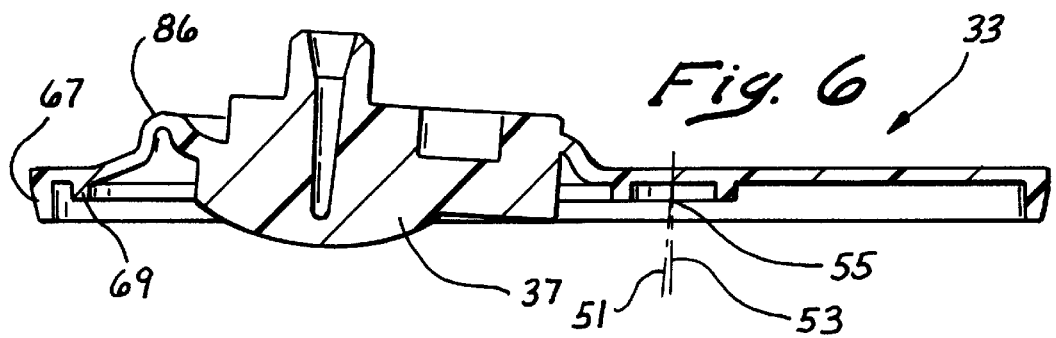
FIG. 6 is a sectional view taken generally along line 6—6 of FIG. 5.

The preferred construction for the flexible diaphragm 33 is shown in FIGS. 5 and 6. The diaphragm 33 has peripheral ribs 67 and 69 for sealingly engaging the housing section 29 and the valve plate 31, respectively. Each of the annular zones 86 is in the form of a convolute which progressively deepens axially as it extends radially outwardly of the point 55 where the nutating axis 53 intersects the axis 51. The thickness of diaphragm 33 progressively increases in annular zones 86 from a point remote from the pumping member 37 to a point adjacent the pumping member. Each of these features, that is a progressively deepened convolute, a progressively thickened diaphragm and a curved inner sidewall surface, described in this paragraph increases the effective life of the diaphragm, for example, by more effectively accommodating the motion, for example, the nutating motion, of the pumping member, by increasing the durability and strength of the diaphragm and/or by reducing stress concentrations caused by the motion of the pumping member.

As shown in FIG. 1, diaphragm 33 (including pumping member 37 and surface 64) cooperates with the valve plate 31 to define pumping chamber 81. Other regions of the diaphragm 33 cooperate similarly with corresponding structures to define two other identical pumping chambers. The pumping chamber 81 has an inlet 83 extending through the valve plate 31 and an outlet 85 which also extends through the valve plate. One resilient inlet valve 87 is received in a generally concave inlet recess 90 of valve plate 31 and is mounted on the valve plate 31 for each of the pumping chambers 81 and is adapted to overlie an associated inlet 83. Except as otherwise described herein, each of the inlet valves 87 may be of conventional construction and include a central mounting portion 94 received in a bore 96 of the valve plate 31 and a resilient section 88. The chamber inlets 83 communicate with a common inlet chamber 89 which leads to the inlet 19. The outlet 85 lead to a common outlet chamber 91 which is in communication with the outlet 21.

A common outlet valve 93 of one-piece integral construction is carried by the valve plate 31 and may be molded from a suitable material, such as rubber. The outlet valve 93 has a central, generally cylindrical mounting portion 95 for mounting the valve on the valve plate and a concave, part-spherical, resilient section 97 surrounding the central mounting portion. The outlet valve 93 also has three radially extending webs spaced apart 120 degrees and extending in both axial directions from the resilient section 97. The number of webs equals the number of pumping chambers.

The valve plate 31 has a generally concave outlet recess 101 for receiving the convex, resilient section 97, and the mounting portion 95 extends through a bore 103 in the valve plate 31. The valve plate 31 also has three slots 105 (FIG. 3) which extend radially between the outlets 85 of adjacent pumping chambers 81. Regions of the webs 99 on the convex side of the resilient section 97 are received within the slots 105, respectively. With this arrangement, resilient portions of the resilient section 97 cover the outlets 85 of the three pumping chambers 81, respectively. These resilient portions would lie between adjacent webs 99 and lift off the associated outlet 85; however, the webs 99 locally stiffen the outlet valve 93 so that the outlet valve can seal the other outlets 85 from the other pumping chambers 81 when one of the pumping chambers is discharging liquid through its associated outlet into the outlet chamber 91. In addition, the portions of the web 99 that are received in the slots 105 cooperate with the slots to further tend to provide a seal between adjacent pumping chambers. In this regard, the webs 99 may be received in the associated slots 105 with some looseness or a friction fit. In this manner, a single outlet valve 93 controls outlet flow from multiple pumping chambers into a common outlet chamber.

As shown in FIG. 1, the outlet chamber 91 can be sealed to the valve plate 31 by an O-ring seal 107.

Figures 2, 3:
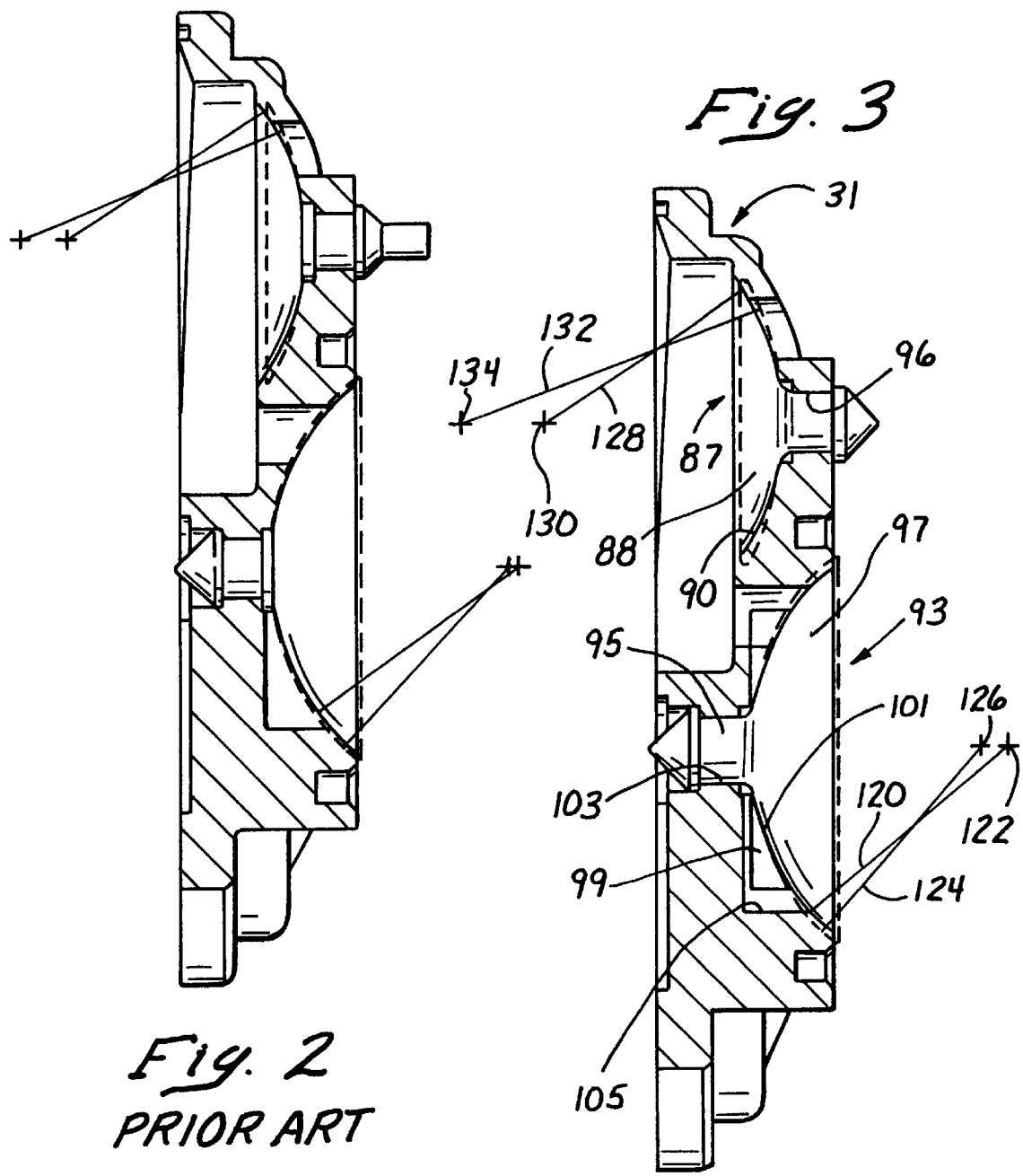
FIG. 2 is a side view, partly in cross-section, of a portion of a valve plate and associated inlet and outlet valves of a prior art pump.
FIG. 3 is a side view, partly in cross-section, of a portion of a valve plate and associated inlet and outlet valves of the pump shown in FIG. 1.

The spacial and size relationship between the outlet recess 101 and the outlet valve 93 and/or between the inlet recesses 90 and the inlet valve 87 are best shown with reference to FIG. 3. The concave outlet recess 101 and the convex surface of resilient section 97 of outlet valve 93 both define a partial sphere. Thus, the concave outlet recess 101 has a radius 120 and a center point 122, called the valve plate outlet radius and the valve plate outlet center point 122, respectively. The convex surface of the resilient section 97 has a radius and a center point (at rest), called the outlet valve radius 124 and outlet member center point 126, respectively. Also, the convex inlet recesses 90 and the concave surfaces of resilient sections 88 of inlet valves 87 define a partial sphere. Thus, concave inlet recess 90 has a radius and a center point, called the valves plate inlet radius 128 and the valve plate inlet center point 130, respectively. The convex surfaces of each resilient section 88 of inlet valves 87 has a radius and a center point, called the inlet valve radius 132 and the inlet valve center point 134, respectively.

It has been found that certain relationships between theses parameters are important in enhancing the useful life and/or effectiveness of the outlet and/or inlet valves of the pumps in accordance with the present invention. These parameters are as follows (using the same units):

R=the ratio of the outlet valve radius to the valve plate outlet radius;

$R_1$=the ratio of the difference between the outlet valve center point and the valve plate outlet center point to R;

$R_2$=the ratio of the inlet valve radius to the valve plate inlet radius; and $R_3$=the ratio of the difference between the inlet valve center point and the valve plate inlet center point to $R_2$.

By way of comparison, consider the prior art valve plate shown in FIG. 2. This prior art valve plate is constructed similarly to valve plate 31 except as expressly described herein. The various radii and center point differences of valve plate 31 differ from similar parameters of the prior art valve plate. A comparison of the two sets of parameters (expressed in inches) is as follows:

|  | Valve Plate 31 | Prior Art Valve Plate |
|---|---|---|
| Outlet Valve Radius | 0.900 | 0.848 |
| Valve Plate Outlet Radius | 0.812 | 0.812 |
| Difference Between Outlet Valve Center Point and Valve Plate Outlet Center Point | 0.089 | 0.031 |
| Inlet Valve Radius | 1.100 | 0.918 |
| Valve Plate Outlet Radius | 0.812 | 0.812 |
| Difference Between Inlet Valve Center Point and Valve Plate Inlet Center Point | 0.290 | 0.155 |
| R | 1.11 | 1.04 |
| $R_1$ | 0.080 | 0.030 |
| $R_2$ | 1.36 | 1.18 |
| $R_3$ | 0.213 | 0.131 |

The pump 10 with valve plate 31 included, performs very effectively with enhanced inlet and outlet valve performance and increased useful or effective life relative to a similarly structured pump in which the valve plate 31 is replaced by the prior art valve plate noted above.

In order to obtain at least a portion of such benefits, the valve plate and inlet and outlet valves are structured, positioned and sized so that R is at least 1.08, preferably in the range of 1.08 and 1.20; $R_1$ is at least 0.06, preferably in the range of 0.06 to about 0.2; $R_2$ is at least 1.25, preferably in the range of 1.25 to about 1.45; and $R_3$ is at least about 0.15, preferably in the range of about 0.15 to about 0.40.

Although the pump 11 is adapted to pump various fluids, it is particularly adapted for the pumping of water. If the pressure in the outlet chamber 91 is below a predetermined lower level, the pressure switch 23 closes a circuit to the motor 13 to bring about rotation of the shaft 41, and nutating motion of the wobble plate 49 and the pumping members 37. This nutating motion periodically flexes the annular zones 86 of the diaphragm 33 to provide a nutating pumping action in each of the pumping chambers 81. The annular zones 86 allow the nutating pumping motion to occur, and the annular zones are tailored to the nutating motion of the pumping members 37.

On the intake stroke in each pumping chamber, the pressure reduction in the pumping chamber reduces to allow the liquid in the inlet chamber 89 to open the inlet valve 87 as shown in FIG. 1 and flow into the pumping chamber. On the discharge stroke, the pressure in the pumping chamber 81 increases over what it is in the outlet chamber 91 so as to force the associated portion of the resilient section 97 away from the outlet 85. The outlet valve 93 cooperates with the valve plate 31 as described above to seal the other outlets 85 from the outlet 85 which is opened.

If desired, the present pump can be equipped with one or more bypass valves to bypass pumped fluid from the outlet to the inlet in the event of excessive outlet pressure.

Although an exemplary embodiment of the invention has been shown and described, many changes, modifications and substitutions may be made by one having ordinary skill in the art without necessarily departing from the spirit and scope of this invention.

What is claimed is:

1. A pump comprising:
    at least a first pumping chamber;
    a diaphragm defining a portion of the first pumping chamber;
    a housing having an inlet, an inlet passage leading from the inlet to the pumping chamber, an outlet and an outlet passage leading from the pumping chamber to the outlet;
    a first pumping member movable in the pumping chamber on an intake stroke whereby fluid from the inlet passage is drawn into the pumping chamber and a discharge stroke whereby fluid in the pumping chamber is discharged into the outlet passage;
    a drive for moving the pumping member on the intake and discharge strokes;
    a valve plate mounted in the housing and having the outlet passage extending therethrough and an outlet area adjacent the outlet passage, the outlet area being concave and in the substantial form of a portion of a sphere having a valve plate outlet radius and a valve plate outlet center point;
    an outlet valve carried by the valve plate and including a convex outlet valve surface adapted to cooperate with the outlet area to control flow through the outlet passage, the convex outlet valve surface being in the substantial form of a portion of a sphere having an outlet valve radius and an outlet valve center point;
    wherein the ratio, R, of the outlet valve radius to the valve plate outlet radius is at least 1.08, and the ratio, $R_1$, of the difference between the outlet valve center point and the valve plate outlet center point to R is at least 0.06.

2. The pump of claim 1 wherein R is in a range of 1.08 to about 1.2.

3. The pump of claim 1 wherein R is in a range of 0.06 to about 0.2.

4. The pump of claim 1 wherein said valve plate further has the inlet passage extending therethrough and an inlet area adjacent the inlet passage, the inlet area being concave and in the substantial form of a portion of a sphere having a valve plate inlet radius and a valve plate inlet center point; the pump further comprising an inlet valve carried by the valve plate and including a convex inlet valve surface adapted to cooperate with the inlet area to control flow through the inlet passage, the convex inlet valve surface being in the substantial form of a portion of a sphere having an inlet valve radius and an inlet valve center point; wherein the ratio, $R_2$, of the inlet valve radius to the valve plate inlet radius is at least 1.25 and the ratio, $R_3$, of the difference between the inlet valve center point and the valve plate inlet center point to $R_2$ is at least about 0.15.

5. The pump of claim 4 wherein $R_2$ is in a range of 1.25 to about 1.45.

6. The pump of claim 4 wherein $R_3$ is in a range of about 0.15 to about 0.40.

7. The pump of claim 1 wherein said outlet valve includes a central mounting portion for mounting the outlet valve on the valve plate, the convex outlet valve surface surrounds the central mounting portion.

8. The pump of claim 4 wherein said inlet valve includes a central mounting portion for mounting the inlet valve on the valve plate, the convex inlet valve surface surrounds the central mounting portion.

9. The pump of claim 1 wherein said diaphragm has a thickness which increases in a region in proximity to said pumping member.

10. A pump comprising:
    at least a first pumping chamber;
    a diaphragm defining a portion of the first pumping chamber;
    a housing having an inlet, an inlet passage leading from the inlet to the pumping chamber, an outlet and an outlet passage leading from the pumping chamber to the outlet;
    a first pumping member movable in the pumping chamber on an intake stroke whereby fluid from the inlet passage is drawn into the pumping chamber and a discharge stroke whereby fluid in the pumping chamber is discharged into the outlet passage;

a drive for moving the pumping member on the intake and discharge strokes;

a valve plate mounted in the housing and having the inlet passage extending therethrough and an inlet area adjacent the inlet passage, the inlet area being concave and in the substantial form of a portion of a sphere having a valve plate inlet radius and a valve plate inlet center point;

an inlet valve carried by the valve plate and including a convex valve surface adapted to cooperate with the inlet area to control flow through the inlet passage, the convex inlet valve surface being in the substantial form of a portion of a sphere having an inlet valve radius and an inlet valve center point;

wherein the ratio, $R_2$, of the inlet valve radius to the valve plate inlet radius is at least 1.25 and the ratio, $R_3$, of the difference between the inlet valve center point and the valve plate inlet center point to $R_2$ is at least about 0.15.

11. The pump of claim 10 wherein $R_2$ is in a range of 1.25 to about 1.45.

12. The pump of claim 10 wherein $R_3$ is in a range of about 0.15 to about 0.40.

13. The pump of claim 10 wherein the inlet valve includes a central mounting portion for mounting the inlet valve on the valve plate, the convex inlet valve surface surrounds the central mounting portion.

14. The pump of claim 10 wherein the diaphragm has a thickness which increases in a region in proximity to the pumping member.

* * * * *

UNITED STATES PATENT AND TRADEMARK OFFICE
CERTIFICATE OF CORRECTION

PATENT NO. : 6,048,183
DATED : April 11, 2000
INVENTOR(S) : Meza

It is certified that error appears in the above-identified patent and that said Letters Patent is hereby corrected as shown below:

Column 5,
Line 54, delete "chamber".
Line 56, delete "outlet" (first occurrence) and insert therefor -- outlets --.

Column 6,
Line 38, delete "concave" and insert therefor -- convex --.

Signed and Sealed this

Twenty-ninth Day of June, 2004

JON W. DUDAS
*Acting Director of the United States Patent and Trademark Office*